J. G. LEFLER.
BRACKET-BANDS FOR VEHICLE-WHEELS.

No. 173,026. Patented Feb. 1, 1876.

WITNESSES:
W. W. Hollingsworth
J. C. Kennon

INVENTOR:
John G. Lefler
BY
ATTORNEYS.

UNITED STATES PATENT OFFICE.

JOHN G. LEFLER, OF PHILADELPHIA, PENNSYLVANIA.

IMPROVEMENT IN BRACKET-BANDS FOR VEHICLE-WHEELS.

Specification forming part of Letters Patent No. 173,026, dated February 1, 1876; application filed December 29, 1875.

*To all whom it may concern:*

Be it known that I, JOHN G. LEFLER, of the city and county of Philadelphia, and State of Pennsylvania, have invented a new and Improved Bracket-Band for Carriage-Wheels; and I do hereby declare that the following is a full, clear, and exact description of the same, reference being had to the accompanying drawing, forming a part of this specification, in which—

Figure 1:
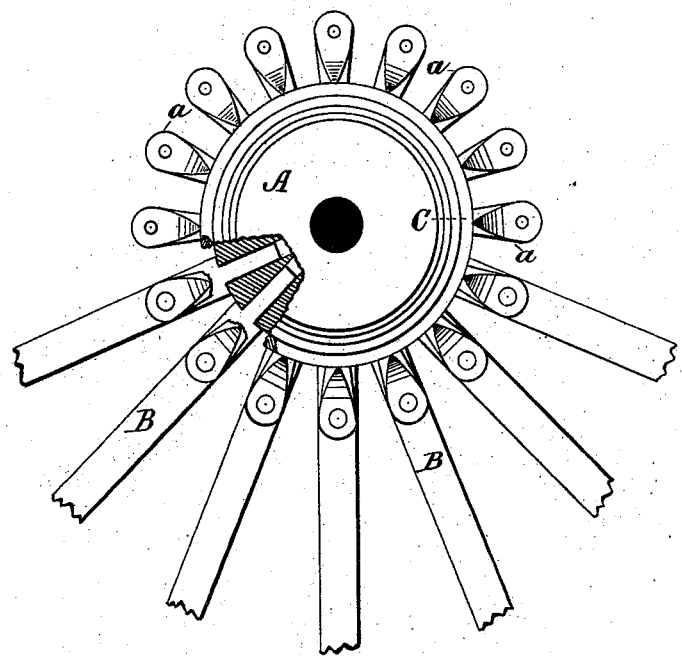
Figure 2:
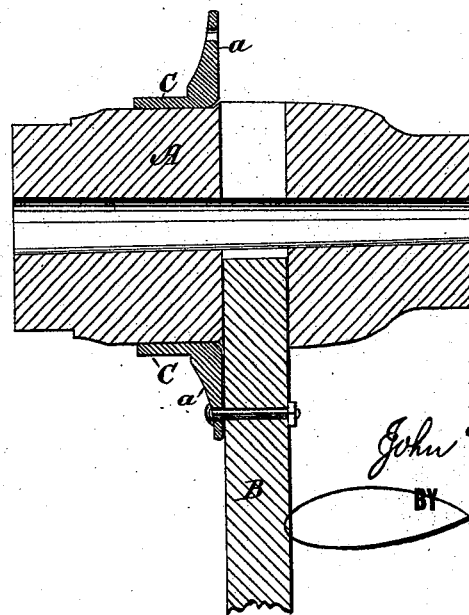

Figure 1 is an end view of the hub provided with my improvement; Fig. 2, a longitudinal section of the same.

The object of this invention is to provide a ready means for repairing the hubs of vehicle-wheels by strengthening the connection between the hub and spokes. The invention may also be applied to advantage in new wheels for additional strength; and it consists in a bracket-band, or a band which is made to encompass the hub with bracket-extensions for each spoke, provided with a screw-eye or bolt-hole, so that when the spoke is inserted in its socket, and fastened by a bolt or screw to the bracket-extension, it is securely held to the hub against all shrinkage, wear, and rattling.

In the drawing, A represents the hub of a wheel for a carriage, wagon, or other vehicle, and B represents the spokes, the tenoned ends of which are inserted in the mortises in the hub.

Now, as the continued wear upon the wheel causes the connection of the spokes with the hub to become loose and insecure, it can no longer form a reliable part of the running-gear, and is, in most cases, cast aside, for the reason that the repairing of the same is a difficult and unprofitable job. To supply a need in this direction I have constructed my bracket-band C, which encompasses the hub, and is provided with the bracket-extension $a$, one for each spoke, and each having a screw-eye. The said band is tightly fitted onto the hub of the wheel, and each one of the extensions is screwed or bolted to its corresponding spoke, so as to unite the spokes and hub tightly together. By means of this construction it will be seen that an old or loose wheel may be quickly and securely re-enforced, so as to last a much longer time; or a new wheel may be constructed, which is adapted to much heavier and more continued usage.

Having thus described my invention, what I claim as new is—

The combination, with the hub and spokes of a vehicle-wheel, of a detachable band, C, having a single set of bracket-extensions, $a$, provided with bolt-holes or screw-eyes for fastening the same to the spokes, as and for the purpose described.

JOHN GEORGE LEFLER.

Witnesses:
RT. JACK,
W. HOLDSWORTH.